(12) United States Patent
Tropf (10) Patent No.: US 7,593,118 B2
(45) Date of Patent: Sep. 22, 2009

(54) OPTICAL GUIDE AND ONLINE CONTROL OF A TOOL

(76) Inventor: Hermann Tropf, Blumenstraβe 5, 68789 St. Leon-Rot (DE)

( * ) Notice: Subject to any disclaimer, the term of this patent is extended or adjusted under 35 U.S.C. 154(b) by 48 days.

(21) Appl. No.: 11/668,850

(22) Filed: Jan. 30, 2007

(65) Prior Publication Data

US 2007/0236565 A1 Oct. 11, 2007

(30) Foreign Application Priority Data

Feb. 9, 2006 (DE) ........................ 10 2006 006 204

(51) Int. Cl.
*G01B 11/14* (2006.01)
*B05C 11/00* (2006.01)
*G05G 15/00* (2006.01)
*B29C 65/78* (2006.01)
*B32B 41/00* (2006.01)
*B65C 9/00* (2006.01)
*B23K 9/12* (2006.01)
*H04N 7/18* (2006.01)
*H04N 9/47* (2006.01)
*G06K 9/00* (2006.01)

(52) U.S. Cl. ........................ 356/614; 118/668; 118/669; 156/350; 156/378; 156/379; 219/124.1; 219/124.34; 348/86; 382/141

(58) Field of Classification Search ........................ None
See application file for complete search history.

(56) References Cited

U.S. PATENT DOCUMENTS 3,532,807 A * 10/1970 Wall, Jr. et al. ............... 348/90

| 4,488,032 | A | * | 12/1984 | Case et al. | 219/124.34 |
| 4,621,185 | A | * | 11/1986 | Brown | 219/124.34 |
| 4,737,614 | A | * | 4/1988 | Richardson | 219/130.01 |
| 4,739,404 | A | * | 4/1988 | Richardson | 348/719 |
| 5,052,338 | A | * | 10/1991 | Maiorca et al. | 118/668 |
| 5,402,351 | A | * | 3/1995 | Batchelder et al. | 700/119 |
| 6,541,757 | B2 | * | 4/2003 | Bieman et al. | 250/221 |
| 6,696,668 | B2 | * | 2/2004 | Hayakawa | 219/121.85 |

FOREIGN PATENT DOCUMENTS

| DE | 20307305 U1 | 9/2003 |
| WO | WO 2005/063406 | 7/2005 |
| WO | WO 2005/063407 | 7/2005 |
| WO | WO 2005/065844 | 7/2005 |

* cited by examiner

*Primary Examiner*—Gregory J Toatley, Jr.
*Assistant Examiner*—Gordon J Stock, Jr.
(74) *Attorney, Agent, or Firm*—William Greener; Bond, Schoeneck & King, PLLC (57) ABSTRACT

Embodiments of the invention are directed to a system arrangement and method for the optical control of the work result of a tool and/or guiding the tool with all-around view, wherein tool and workpiece are moved relative to each other, along a straight path or, particularly, on curved path. According to an aspect, the tool is positioned centrically in the image field and a tool support is located centrically in the beam path or in a pupil of the optics, or in an optical vicinity of the pupil. An arrangement for 3D analysis is also indicated. Advantageously, only one camera need be used, providing a lean design of viewing and illumination, and usable under cramped space conditions. Guiding, processing and control are possible in a single operation using a single camera. Methods for, e.g., applying viscous masses, welding, deburring, and related applications are also disclosed.

9 Claims, 6 Drawing Sheets

OPTICAL GUIDE AND ONLINE CONTROL OF A TOOL

RELATED APPLICATION DATA

This application claims priority under 35 USC §119(a-d) to DE 10 2006 006 204.3-14 filed in the German Patent Office on Feb. 9, 2006, the subject matter of which is hereby incorporated by reference in its entirety.

BACKGROUND

1. Field of the Invention

Embodiments of the invention generally relate to tool control apparatus and methods. More specifically, the disclosed embodiments are directed to methods and apparatus for optically guiding a tool and/or the control of the work result of a tool that is moved relative to a workpiece in a straight or a curved path, for example. Non limiting example applications of the disclosed embodiments include the application of highly viscous masses such as adhesive beads or sealing beads, welding, soldering, marking, deburring, engraving.

2. Description of Related Art

The business and technology related to the application of highly viscous masses such as adhesive beads or sealing beads, welding, soldering, marking, deburring, engraving, e.g. (including controlling and guiding) is economically important.

The placement location and sizing of adhesive beads, sealing beads, pattern beads or corresponding structures (hereinafter, beads) formed by application of a viscous mass are typically controlled. In addition to correctly positioning the beads relative to the component, width can be controlled by means of two-dimensionally operating image analysis systems that use halftone pictures processing techniques. Applications such as, e.g., the window assembly in automotive engineering additionally require a height control and the control of observing the geometry of a special cross-section of a profile.

Known arrangements for width and position control may use a sensor comprising a camera and an illumination setup, basically aligned to each other in a manner where the illumination incidence angle equals angle of reflection). For the height control or profile cross-section control, light section methods (triangulation by means of structured light) are currently typically used, e.g., one or more laser lines and a camera for capturing the reflected light. For "online" control, i.e., for control during the bead application, the sensor may be typically mounted in the vicinity of the application nozzle and is in general fixedly connected to it.

During bead application, the application nozzle moves relative to the workpiece on which the bead is applied. It is thus basically irrelevant whether the nozzle moves while the workpiece is fixed or vice versa.

With regard to online control, the camera should be directed at the area behind the application nozzle. When the application paths are curved, the sensor has to be turned around the application nozzle in order to constantly record the area behind the application nozzle. Such turning is also desirable when shaped beads are applied. If the nozzle is moved by a robot, the robot may effect the turning. If the nozzle is stationary and a part is moved by the robot, the robot may also effect the turning. However, in the case of large parts as they are common in car manufacturing, a lot of space may be required. If the required space is to be reduced, extra turning means will be required. Alternatively, when used together with extra turning means, simple and cost-effective x-y systems may replace robots.

However, extra turning means should be avoided for the sake of expenditure. In this context, e.g., DE 20307305 U1 discloses that monitoring means with one or more cameras can be fixed at the tool such that the visual range of the camera(s) is always directed to the working area and/or a fixed monitoring area in case of movement of the tool and/or an object to be processed. With several cameras on a concentrically arranged circle provided with a cut-out for the tool, a basically circular monitoring area can be realised which is created by the visual ranges of the several cameras. Thus the monitoring area is basically independent of the alignment of the tool. According to the referenced disclosure, monitoring around the tool requires at least two cameras with overlapping working/monitoring areas. An arrangement with only one camera suitable for complete control is not indicated.

Similar arrangements requiring several cameras are disclosed in WO 2005/065844, WO 2005/063406, WO 2005/063407. In all cases, at least two cameras, and often, preferably, three are required to create a monitoring area around the workpiece A disadvantage of these arrangements is that several cameras are generally necessary whose pictures even have to be analysed at the same time. Furthermore, a greater amount of space is required transverse to the movement direction. This is particularly disadvantageous when the bead is to be applied under cramped space conditions (e.g., along steep profiles). Other disadvantages include disturbances in illumination due to shadowing. Moreover, these arrangements may not be suitable for a height controller only with several or more cameras.

When the tool is guided by an optical sensor, e.g., when tracking an edge, a groove, a weld bead, or when selectively setting the movement by means of "landmarks" such as holes or edges, the same problems and disadvantages may be present: according to the prior art so far. Thus, it would be beneficial and advantageous to provide a system requiring only a single camera in place of the several guiding cameras which are necessary to avoid a turning movement with respect to a curved path, with great differences in direction.

SUMMARY OF THE INVENTION

It would also be advantageous to provide a system and method that avoid the above described disadvantages associated in the current state of the art.

According to an embodiment, there is disclosed an arrangement for optical control of a work result of a tool. According to an aspect, the system is directed to a camera coupled to an optics system and having an imaging beam path for optically guiding a tool, wherein the tool is moved relative to a workpiece. In an aspect, the tool is moved along a straight path, Alternatively, the tool may be moved along a curved path. The tool is positioned in an image field of the camera such that a tool support in the imaging beam path is at least one of approximately centrically located in the imaging beam path and located directly in a pupil of the optics or in an optical vicinity thereof such that the tool support is either not seen or is sufficiently blurred, further wherein a working area around the workpiece is visible for analysis.

According to another embodiment, a method is disclosed for joining or gripping by a technique of visual servoing, comprising providing a tool; providing a camera coupled to an optics system and a control system for guiding the tool via the camera and the optics system, and having an imaging beam path, wherein the tool is moved relative to a workpiece along a straight or a curved path, for example; providing a tool support coupled to the tool; positioning the tool in an image field of the camera such that the tool support is either centrically located in the imaging beam path or located directly in a pupil of the optics or in an optical vicinity thereof, such that the tool support is not seen or is sufficiently blurred, further such that a working area around the workpiece is visible for analysis.

The foregoing and other objects, features, and advantages of embodiments of the present invention will be apparent from the following detailed description of the preferred embodiments, which makes reference to several drawing figures, and the appended claims.

DETAILED DESCRIPTION OF A PREFERRED EMBODIMENT OF THE INVENTION

Figure 1:
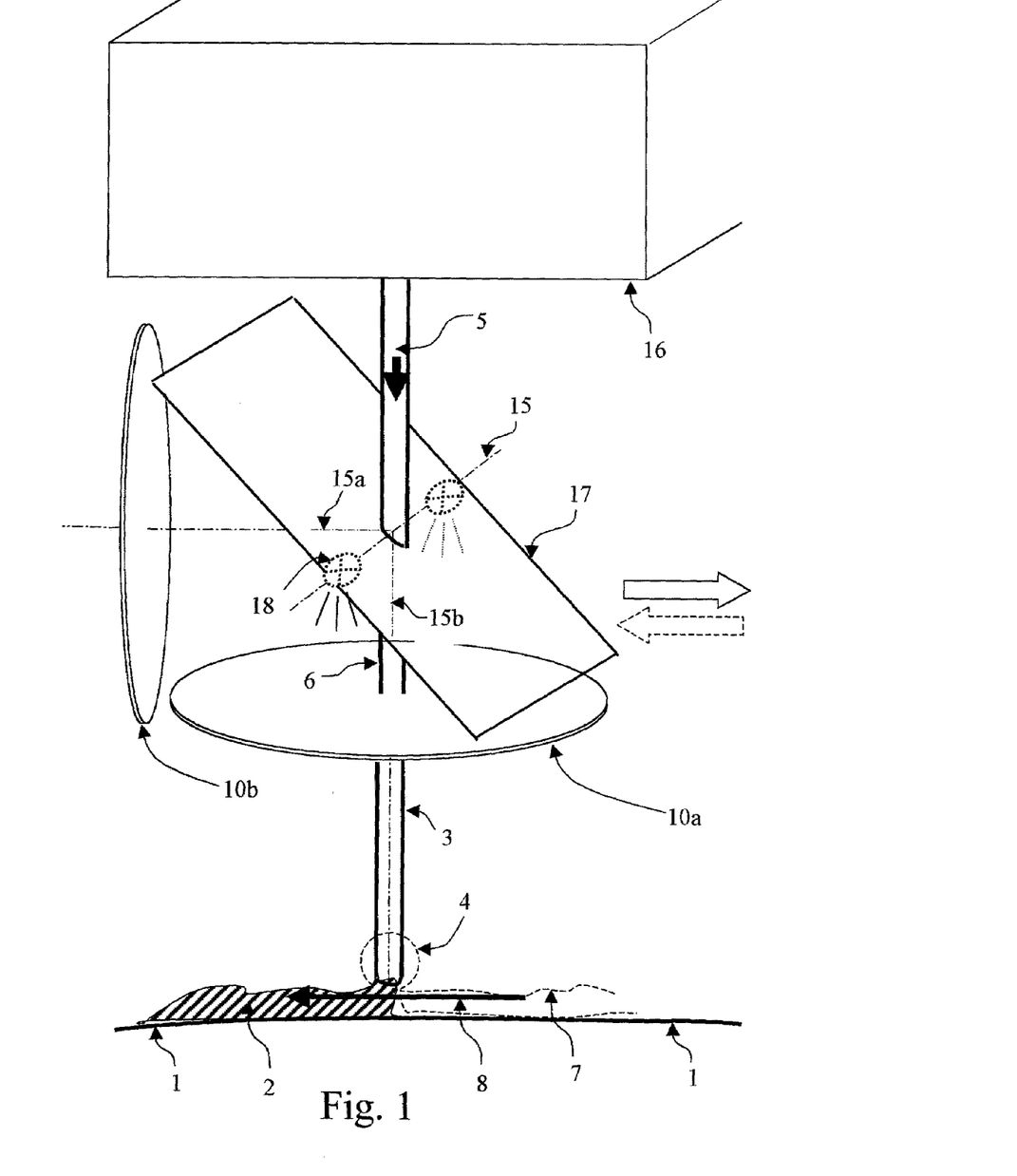
FIG. 1 is a schematic illustration of a system according to an embodiment of the invention.
Figure 2:
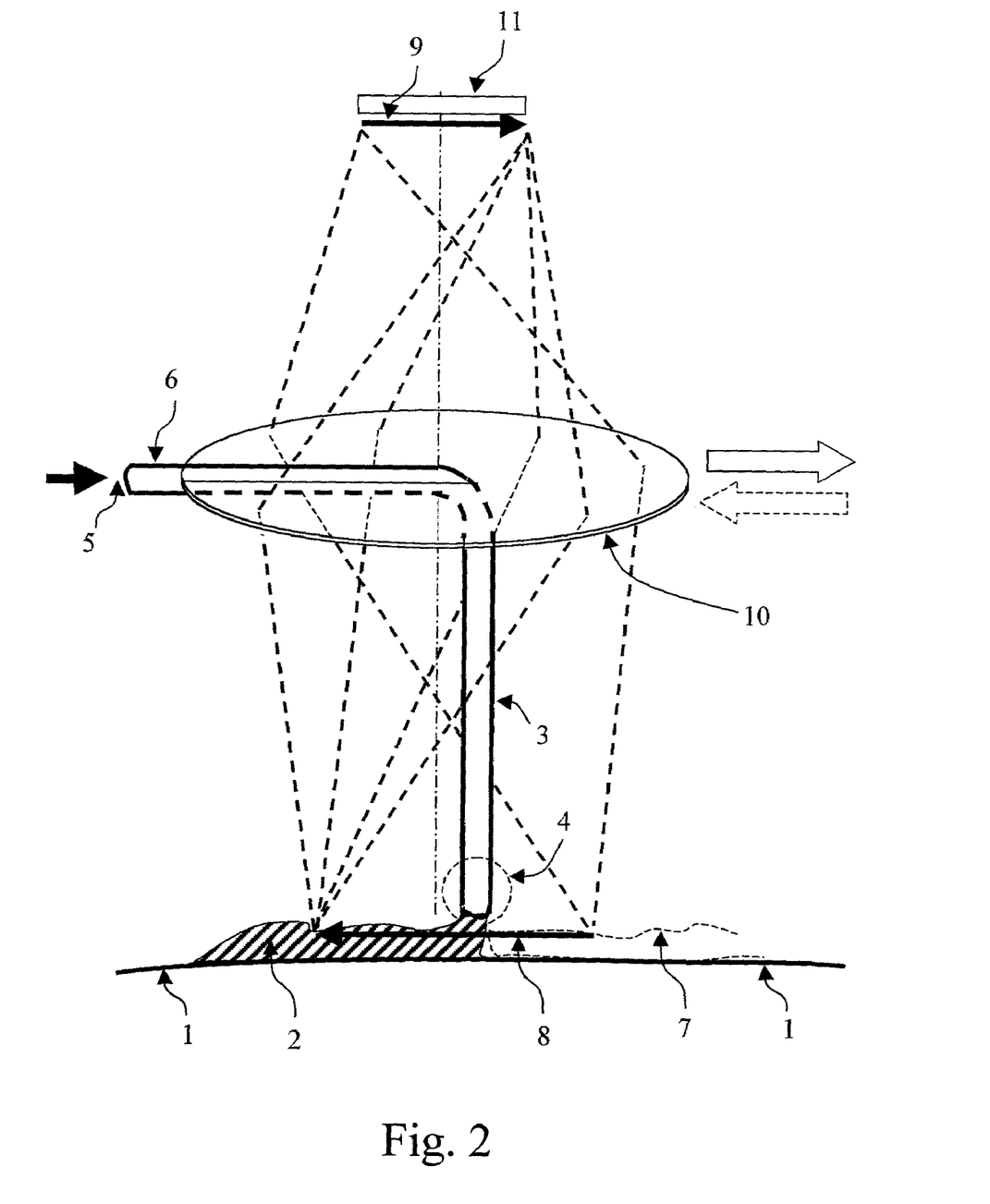
FIG. 2 is a schematic illustration of a system according to an aspect of the invention.

Referring to the various figures, and, in particular to FIG. 2, for optical control of the work result of a tool 3 and/or for optically guiding the tool 3 via a camera 11 with optics 10, 10a, 10b, wherein the tool is moved relative to a workpiece 1, in particular on a curved path, the tool is placed at least approximately centrically in the image field 8, and its support 6 be located within the beam path either approximately centrically in the beam path, directly in a pupil 15 (FIG. 1) of the optics 10, 10a, 10b, or at least near enough to the pupil of the optics that the support 6 is not visible, or is blurred, such that the working area (image field) 8 around the workpiece is visible for analysis.

The pupil is the aperture (e.g., aperture stop) of an optical system. In the case of very simple lens systems, the lens itself is the pupil. In more complex systems, e.g., in the known Köhler illumination, the aperture is depicted in real intermediate images. The term pupil, as used herein, means the region of an effective aperture or the region of an image thereof. Regarding a telescope, e.g., the exit pupil is an image of the aperture stop in image space. Note: what is not meant herein, by use of the term pupil, is the entrance pupil of an optics as virtual image of the aperture stop behind the front lens when the distance between aperture stop and front lens is smaller than their focal distance, i.e., the front optics acts as a magnifying glass.

The tool 3 (the application nozzle in the example) is positioned at least approximately in the centre of the beam path. The support 6 extends through the beam path and is thus either at least approximately in the centre of the beam path, or in a pupil or in the optical vicinity of the pupil. What is true for the support also applies to an energy supply (current, air pressure, . . . ) or material supply (adhesive, welding wire, . . . ) inasmuch as required; an energy or material supply 16 (FIG. 1) may be a support at the same time.

Depending on detail geometry, the support 6 (possibly also energy/material supply) is either not depicted or is depicted blurred or partly blurred; the blurred image being superimposed over the normally sharp image of the image field 8. In this context the blurring may be sufficient such that the image field to be analysed can simply be analysed via an automatic processing.

The solution is described at first by means of the example "bead control" and a simple lens which is, at the same time, the pupil of the imaging system, see FIG. 2. On the workpiece 1 a bead 2 is applied with a tool 3, here the vertical tubular applicator for the adhesive bead, having a nozzle 4 at the lower end. The material supply takes place at the position 5 (arrow) into the horizontal part 6 of the tube. The horizontal part 6 is, at the same time, support for the vertical part 3 of the tube which—depending on the use and point of view—can be optionally regarded as tool or support for the tool. During application of adhesive, the tool is moved relative to the workpiece, if in the figure to the right (solid arrow), the bead is generated at the left-hand side to the tool, at the position 2. If the tool is moved in the figure to the left (dashed arrow), the bead is generated in position 7 shown with a dashed line. The bead in an image field, indicated with the arrow 8, is depicted on an image, indicated with the arrow 9, via an optics 10 (objective). The image 9 may be on the surface of the camera sensor array 11, as shown, or it may be an intermediate image which is displayed on a camera sensor array via a further optics (not shown). The tool 3 is approximately centrically located in the image field of the camera, but is shown purposely shifted by a desired amount in the direction facing away from (to the right in the figure) the support 6 (see below). For the sake of illustration, the optics 10 is drawn as a flat disc as is the case when using a zone plate, but generally it may also be a lens or a lens system. According to the embodiment, the support 6 is in the optics, which, in case of a simple lens here, is identical with the pupil. Thus, it is achieved that the support 6 in the image 9 above or in front of the optics (in the image 8 below) is not depicted or almost not depicted. If the support is just behind or, in front of the optics, a slight one-sided darkness or opaqueness of the image 9 occurs at the blunt or sharp end, respectively, of the arrow of the image 9. Such a slightly one-sided opaqueness may be compensated for by conventional image processing methods such as shading correction. The above-mentioned deliberate shifting of the tool from the centre of the optics serves as a brightness offset to reduce the one-sided opaqueness. Despite the covering of the optics 10 by the support 6, the complete image around the tool is depicted, as indicated by the image beams drawn in dashed lines since a point is formed not only by beams in the drawing plane (they are partly blocked by the support or the workpiece) but also by beams running diagonally into and from the drawing plane.

In a particular embodiment, a coaxial illumination through the optics is realised with a semitransparent mirror, beam splitter cube, or other suitable optic in the separated region between the optics 10 and sensor array 11 as is known from the industrial image analysis. Thus, the compliance with equal incident and reflected (glancing angle) light with narrow illumination and viewing angle is obtained.

Figure 6:
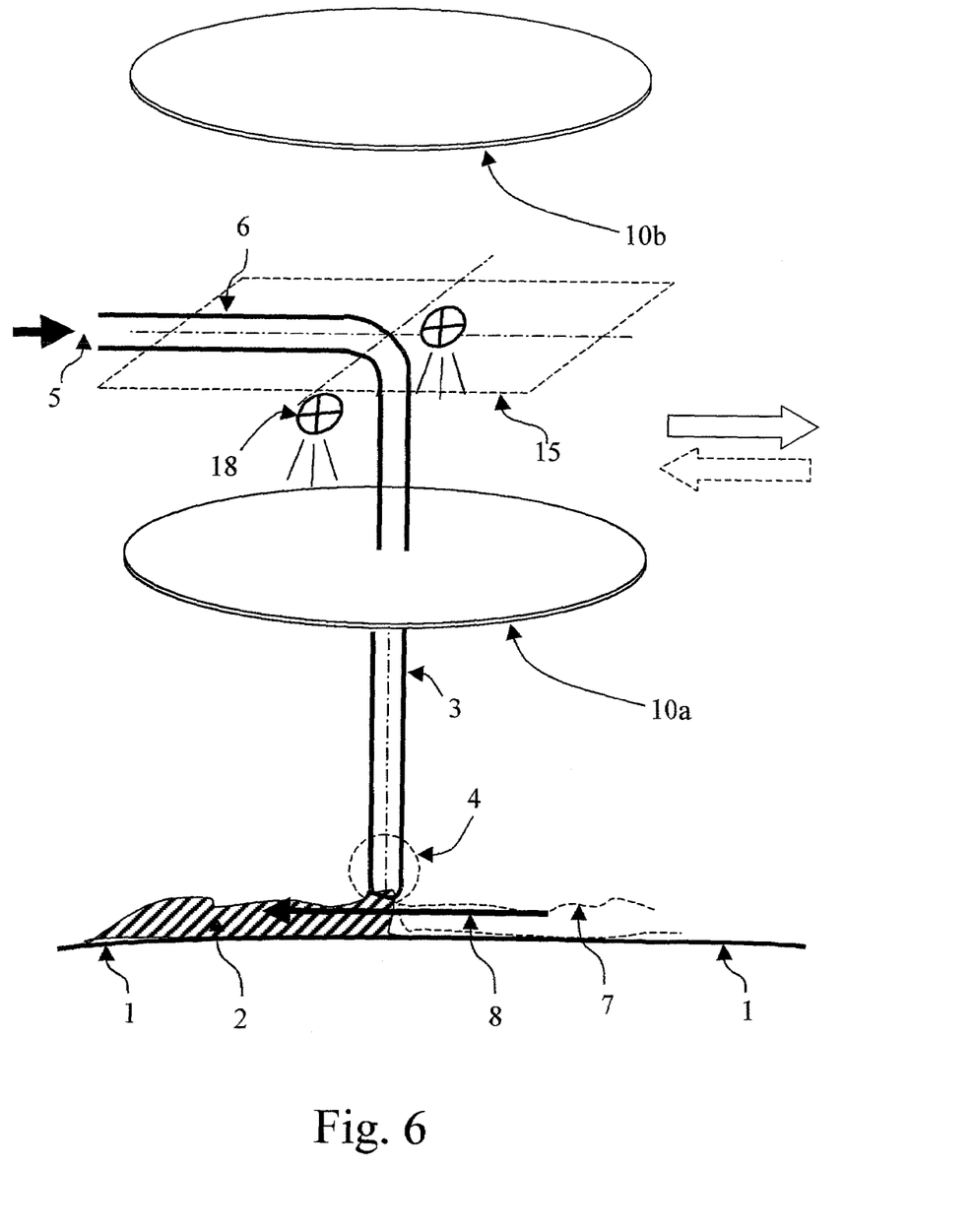
FIG. 6 is a schematic illustration of a system according to an aspect of the invention.

According to an aspect of the invention, a particularly advantageous illumination is an illumination in or in the vicinity of the pupil. If the illumination consists of individual point sources of light, two light sources 18 (as shown in FIG. 6) will suffice in order to, possibly via the optics, illuminate the area all around the workpiece approximately coaxially. Since the light sources (including current supply) are at least approximately in the pupil, they will not be depicted in the image or will be depicted only in a very blurred manner. Thus, a particular lean construction of the overall system with illumination in glancing angle (catch light angle) is possible.

In another aspect, a conventional illumination outside the optics 10a, 10b may also be realised, for example as ring light around the optics, in particular also supplementarily to the above arrangement in order to achieve a reduced sensitivity with respect to various workpiece tilting angles.

Figure 3:
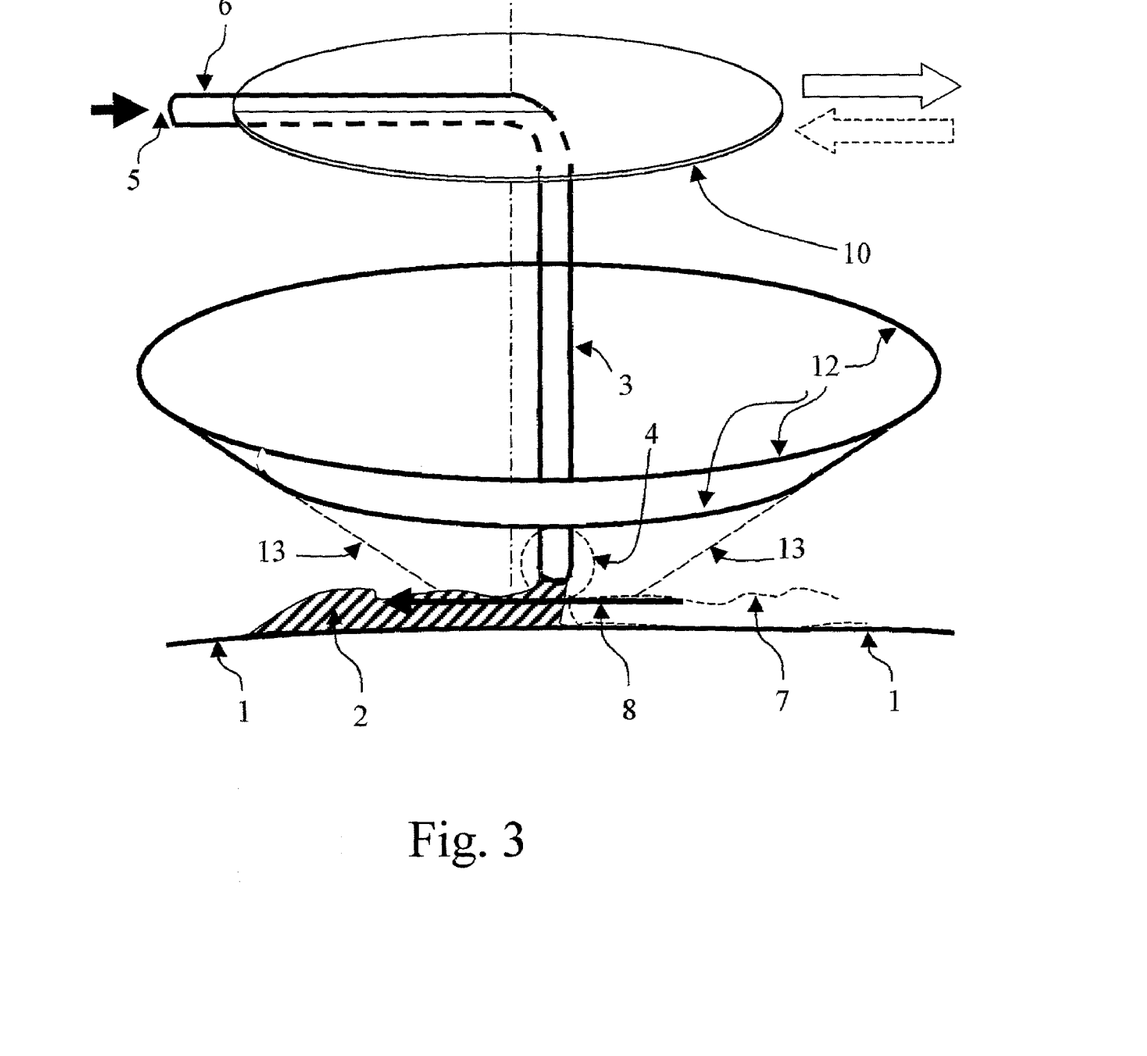
FIG. 3 is a schematic illustration of a system according to an aspect of the invention.

In a specific embodiment with reference to FIG. 3, the arrangement is supplemented by optical means 12 for cone-like illumination with a light edge 13 or a light slot 13 around the workpiece. In this manner, a 3D analysis of the bead can be realised as has been known so far with straight bead courses or means with mechanical turning. Of course, the cone does not have to be circular but may be a closed polygon of straight, possibly slightly overlapping laser lines.

Figure 4:
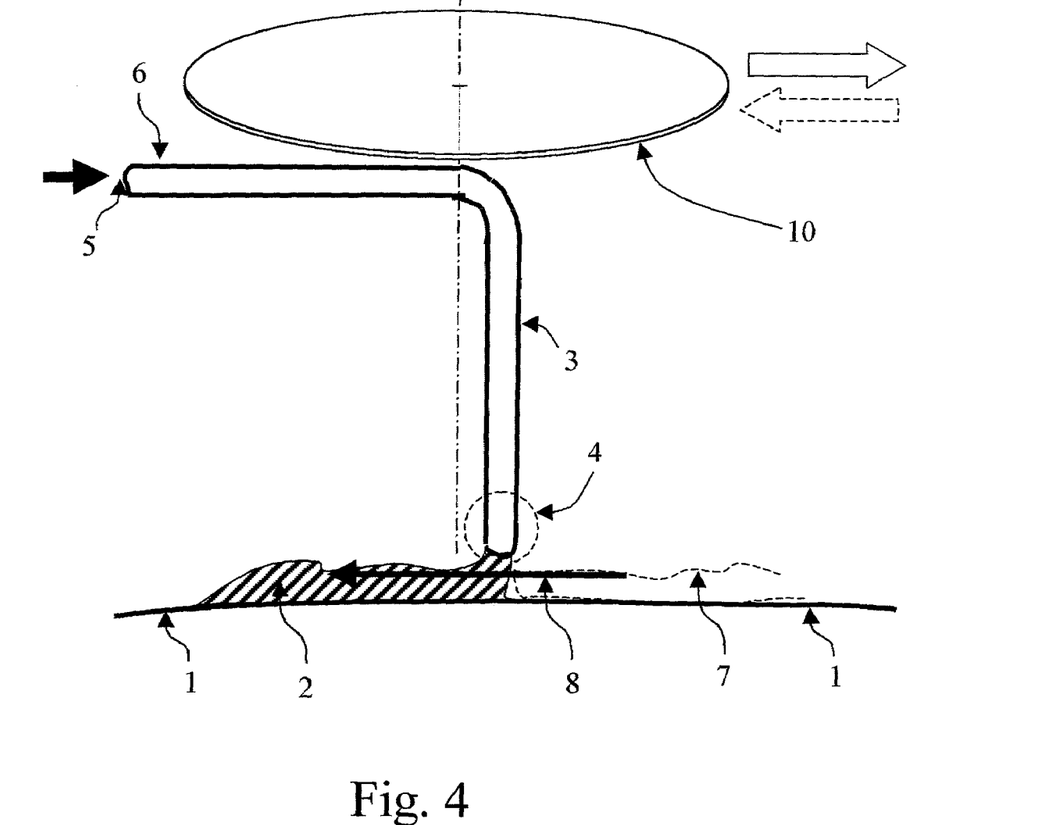
FIG. 4 is a schematic illustration of a system according to an aspect of the invention.

An aspect in which the guiding of the support 6 is shown in FIG. 4. An improved solution is achieved when, in approximately this geometry, the support 6 in a real pupil is outside the optics. Such designs are reported.

Figure 5:
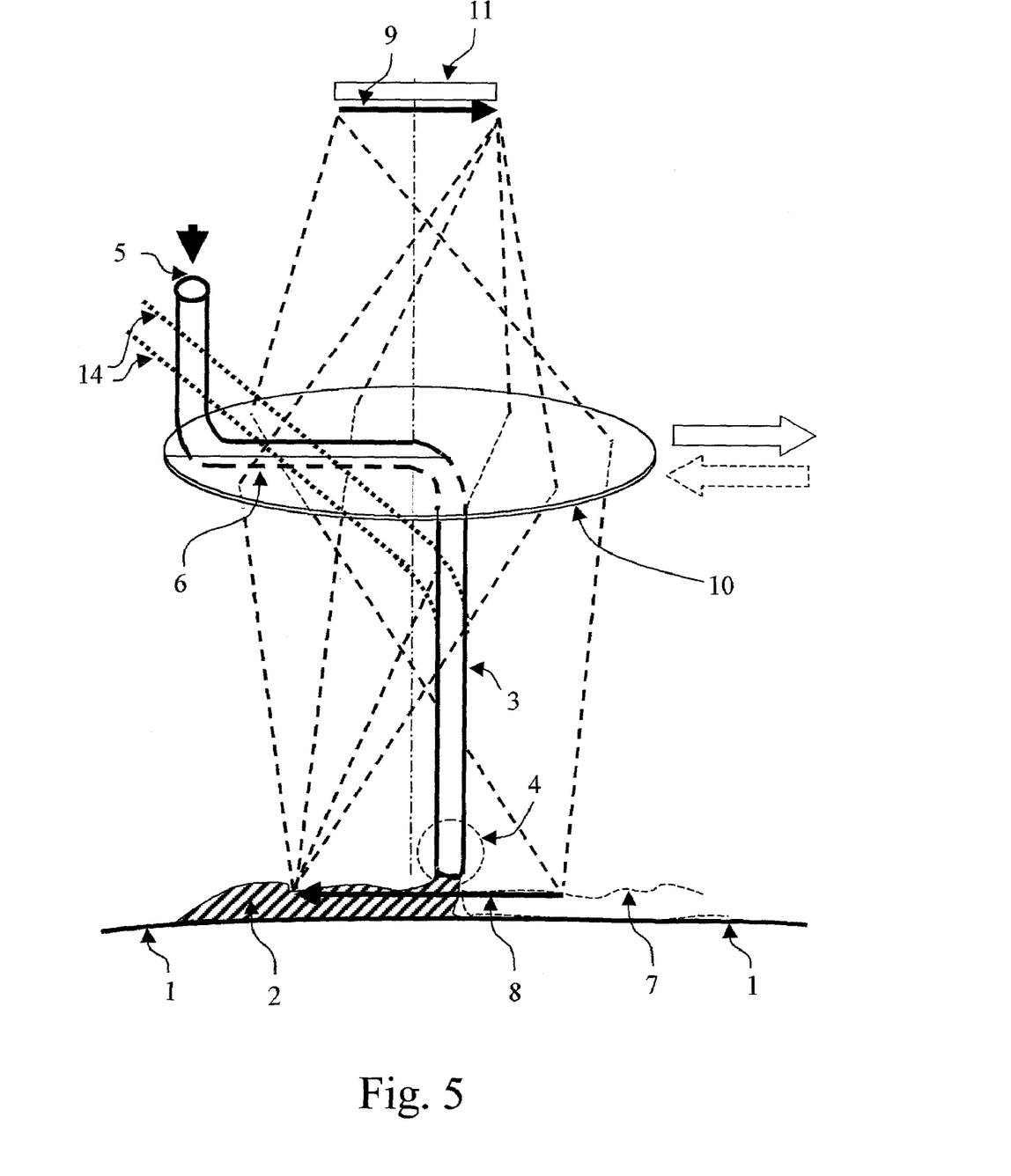
FIG. 5 is a schematic illustration of a system according to an aspect of the invention.

A more space-saving system aspect having a bent material supply is shown in FIG. 5. An inclined course of the support through the pupil may also be realised with reduced curvature of the material supply, as is shown in this Figure with the dotted lines 14.

Referring again to FIG. 6, the support 6 is within the pupil of the optics, however, the arrangement can be technically realised more easily. The optics 10, as shown in FIG. 2, consists of two part-optics 10a and 10b (possibly simple lenses), the pupil 15 is positioned in-between and in a particular aspect in the middle. The optics 10a and 10b together act as an imaging system of image field 8 on image 9 (FIG. 2). Since the support is within the pupil, it is not depicted (i.e. optically seen) nor in a blurred manner. For production, only the front lens 10a has to be bored through in the middle, cutting out the front lens in more complicated form (such as according to FIG. 2) is not necessary and still the support 6 is within the pupil.

The material supply occasionally has to take place, for reasons of design or process, only via a straight or only slightly curved tube, possibly even as short a tube as possible e.g. when heating is involved. In particular, depending on use, it has to be noted that dosage means 16, as shown in FIG. 1, may require a lot of space. As a solution, it is suggested that the focusing beam path according to FIG. 1 be deflected via a mirror 17. The supply tube 6 is not (or only slightly) bent and leads through a hole in the mirror. In FIG. 1, the supply tube leads through a hole in the front optics 10a, like in FIG. 6. The right part of the pupil 15 of FIG. 6 is reflected downwards into the plane 15b as shown in FIG. 1; the pupil is positioned in the semi-planes 15a, 15b. The support 6 is positioned, seen from below in the beam path, in the centre of the beam path; in the beam path, seen from the left, in the pupil 15b ("right/top/bottom" depending on the Figure). In the paper plane alone the support 6 blocks the view on bead layer 7. Layer 7, however, is depicted clearly by beams diagonally to the drawing plane.

Of course, from a constructional point of view, depending on the supply material (e.g., welding wires) and geometric basic conditions, also corresponding combined solutions are possible with slightly curved material supply and "semi" bent beam path.

According to Applicant's experience, realisation of the entire beam path is considerably simplified when the imaging of the optics 10 or 10a/10b leads on an intermediate image which is caught on a ground-glass screen and depicted in a reduced scale via a further optics on the sensor array 11. Usually no ground-glass screens are used with regard to intermediate images. Contrary thereto, the solution with ground-glass screens has a lower brightness, however, the entire optics is considerably smaller.

A solution according to FIG. 6 or 1, however, without front optics 10a to be bored-through, is achieved with an optics 10 with real entrance pupil in front of the optics 10b, as explained above with regard to FIG. 4.

A further alternative is the positioning of a mirror like FIG. 1, however, in a real pupil in front of the front optics 10 or 10a (without Figure).

Of course, the described arrangement works not only for bead application but also for other uses as exemplary mentioned above. In a welding or soldering system, a material supply can be basically realised as shown in the Figures, here preferably less curved solutions and those which need not lead through an optics. A support with current supply (spot welding, roll welding . . . ) can be realised in or near a pupil, arranged radially in or near the optics (mounting on rods extending radially outwardly). It would be basically also conceivable for objects without current and material supply to directly mount the tool without additional support directly in the centre of the optics.

Objects of the optical guiding can be achieved with exactly the same arrangements. Thus, e.g., a curved workpiece edge may be tracked along which a sealing bead is to be placed without changing the orientation of the workpiece or the sensor. This is particularly valuable as far as closed contours are concerned. The objects of guiding and control can be realised with the same arrangement without the need of an extra turning means.

A further use is the guiding for precise gripping or joining of components. The tool is a gripper (e.g. vacuum gripper, expanding gripper, etc.) or a part to be joined (e.g., bolt, here representing the tool) which, e.g., is to be inserted in a bore hole in the workpiece. Since the image field is carried with the tool relative to the workpiece, a small image field can be used, with high resolution the workpiece and tool are permanently in the field of view, i.e., around the tool and with a view perpendicularly on the workpiece (no distortions due to inclined view) comprising all advantages with regard to measuring practice. A workpiece can be exactly gripped and a part be joined with the arrangement described herein, possibly controlled, i.e., via visual servoing (workpiece and tool always in sight).

The camera has a connected or integrated image evaluation unit as common in industrial image processing.

Advantages of the disclosed embodiments therefore include the following:

Only one camera is used (price, space required), the viewing bundle of rays is narrow. In coaxial illumination, the illumination bundle of rays is also narrow. The construction is realisable in a narrow manner in all lateral directions which particularly has an effect with regard to closed contours and at least partly steep workpiece profiles or constrictions (no/little collision problems, no/little shadowing).

The switching between cameras and simultaneous analysis of several cameras required for many practical uses is not necessary. This is particularly important concerning online analysis since speed is in demand.

The advantage of the particularly lean design of the illumination and viewing beam path around the tool naturally also has an effect on applications with non-curved path, especially as regards guiding and/or control tasks under cramped space conditions.

The 3D evaluation on the basis of a cone-like illumination can be combined with a 2D evaluation on the basis of one of the other illumination methods, wherein preferably for division of the evaluations, time-division multiplexing (switching of illuminations) or colour-division multiplexing (use of a colour camera chip and different wavelengths for the different kinds of illumination) are used.

Applications are possible in which guiding, processing and control can be realised in one operation with only one camera, e.g., the precise tracking of a (possibly roughly given) joint, its sealing with sealing material and the immediate control of the applied sealing material, possibly by controlling the material supply parameters on the basis of the measured control values.

Advantageously, the arrangement may be used for gripping or joining via visual servoing.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A system that optically controls a work result of a tool and/or that optically guides the tool using a camera coupled to an optics system and having an imaging beam path, and wherein the tool is moved relative to a workpiece, comprising:
    the optics system including a front lens component and a rear lens component, wherein the front lens component has a location that is farther from the camera than the rear lens component and, a pupil that is located between the front lens component and the rear lens component, wherein the tool has a location at least approximately centrically in an image field of the camera;
    a mirror that is located in the pupil such that the imaging beam oath is deflected by the mirror, wherein the mirror has a hole therethrough; and
    a tool support that is located in the imaging beam path, and which passes through the hole in the mirror, in a position that is at least one of a) approximately centrically in the imaging beam path, b) directly within the pupil of the optics system, and c) in a non-imaging optical region of the pupil, wherein for cases b) and c) the tool support is one of not optically depicted and optically blurred in an image formed by the optics system.

2. The system according to claim 1, wherein the mirror is a semi-transparent mirror.

3. The system according to claim 1, wherein the tool is adapted to be moved along a curved work path relative to the workpiece.

4. The system according to claim 1, further comprising an illumination source having at least two light sources, in which the illumination source is in a location at least in a region of the pupil.

5. The system according to claim 4, wherein the at least two light sources are approximately point sources of light.

6. A method for guiding a tool for joining or gripping a workpiece or for controlling a work result of the tool by a technique of visual servoing. Comprising;
    providing the tool;
    providing a camera coupled to an optics system that provides an imaging beam path, wherein the optics system includes a front lens component and a rear lens component, wherein the front lens component has a location that is farther from the camera than the rear lens component, and having a pupil located intermediate the front lens component and the rear lens component;
    providing a control system for guiding the tool via the camera and the optics system, wherein the tool is moved relative to the workpiece;
    providing a tool support coupled to the tool;
    positioning the tool at least approximately centrically in an image field of the camera such that the tool support is positioned in the imaging beam path at a location that is at least one of a) approximately centrically in the imaging beam path, b) in the pupil of the optics system and c) in a non-imaging optical region of the pupil such that for cases b) and c) the tool support is one of not optically depicted and optically blurred in an image; and
    providing a mirror in the pupil of the optics system, wherein the mirror has a hole therethrough and locating at least a portion of the tool support through the hole.

7. The method according to claim 6, comprising moving the tool relative to the workpiece along a curved path.

8. A method for guiding a tool, for joining or gripping a workpiece or for controlling a work result of the tool by a technique of visual servoing, comprising;
    providing the tool;
    providing a camera coupled to an optics system that provides an imaging beam path, wherein the optics system includes a front lens component and having a pupil located in front of the front lens component outside the optics system;
    providing a control system for guiding the tool via the camera and the optics system wherein the tool is moved relative to the workpiece;
    providing a tool support coupled to the tool;
    positioning the tool at least approximately centrically in an image field of the camera such that the tool support is positioned in the imaging beam oath at a location that is at least one of a) approximately centrically in the imaging beam path, b) in the pupil of the optics system, and c) in a non-imaging optical region of the pupil such that for cases b) and c)the tool support is one of not optically depicted and optically blurred in an image; and
    providing a mirror in the pupil of the optics system, wherein the mirror has a hole therethrough and locating at least a portion of the tool support through the hole.

9. The method according to claim 8, wherein the tool is adapted to be moved along a curved work path relative to the workpiece.

* * * * *

UNITED STATES PATENT AND TRADEMARK OFFICE
CERTIFICATE OF CORRECTION

| | |
|---|---|
| PATENT NO. | : 7,593,118 B2 |
| APPLICATION NO. | : 11/668850 |
| DATED | : September 22, 2009 |
| INVENTOR(S) | : Tropf |

It is certified that error appears in the above-identified patent and that said Letters Patent is hereby corrected as shown below:

Column 8, line 3, replace "servoing. Comprising;" with -- servoing, comprising: --

Column 8, line 31, replace the semi-colon after "comprising;" with a colon, specifically, -- comprising: --

Signed and Sealed this

Sixteenth Day of February, 2010

David J. Kappos
*Director of the United States Patent and Trademark Office*